S. S. REMBERT.
Improvement in Apparatus for Transmitting Motion.
No. 118,554. Patented Aug. 29, 1871.
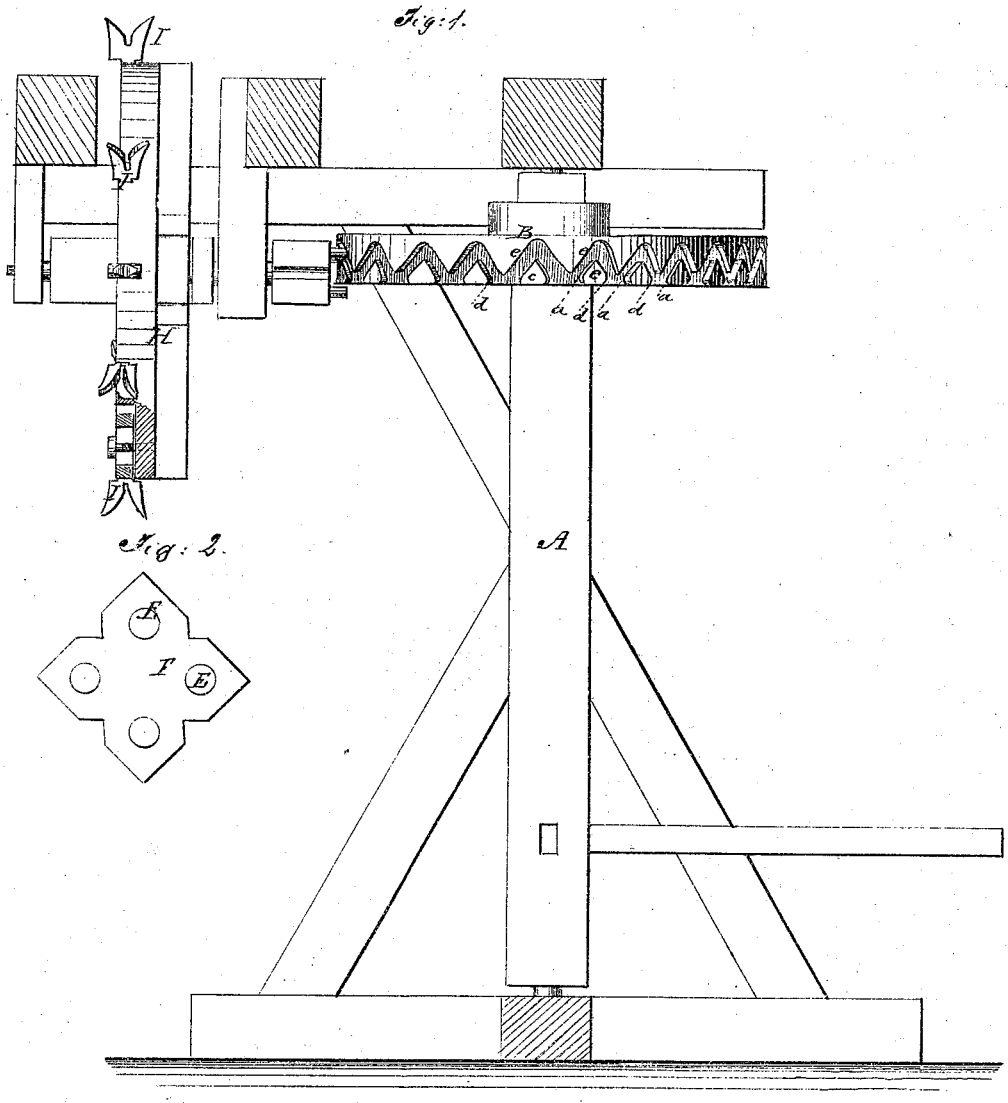
Witnesses:
Inventor:

UNITED STATES PATENT OFFICE.

SAMUEL S. REMBERT, OF MEMPHIS, TENNESSEE.

IMPROVEMENT IN APPARATUS FOR TRANSMITTING MOTION.

Specification forming part of Letters Patent No. 118,554, dated August 29, 1871.

*To all whom it may concern:*

Be it known that I, SAMUEL S. REMBERT, of Memphis, in the county of Shelby and State of Tennessee, have invented a new and Improved Apparatus for Transmitting Motion; and I do hereby declare that the following is a full, clear, and exact description thereof, which will enable others skilled in the art to make and use the same, reference being had to the accompanying drawing forming part of this specification.

This invention relates to improvements in gearing for communicating motion from one shaft to another at a right angle or thereabout with it; also, in driving-wheels for working endless chains, wire ropes, and the like.

Figure 1 is a side elevation of a horse-power constructed according to the said improvements, a part of the chain-drum being sectioned; and Fig. 2 is a side view of the pinion used on one of the shafts for gearing with the drum on the other.

Similar letters of reference indicate corresponding parts.

In this example the vertical shaft A is the driver, having a large drum, B, with a zigzag groove, D, in its face, the angles of which are perpendicular or thereabout. The said groove is so arranged relatively to the face of the drum as to extend to one edge thereof and open out to the side, say the lower one, whereby the walls *a* of one side of the groove terminate short of the apex that would be formed by the prolongation of the walls *a* on said side of the disk. The small parts C of the face of the drum separated by the groove are cut off at the lower corners on the lines *d*, so that the walls *a* are still further shortened, thus leaving free space for the teeth E of pinion F to shift from one opening to another into the groove D, for imparting rotation to it by the action of the walls of the groove on said teeth, which, projecting from the side of said pinion, enter said grooves, the axis of said pinion being about in the same plane that the angles formed by the levers *d a* are. There are preferably four of the teeth E, but may be more. Two of these teeth being in the groove D at once, one on each side of one of the parts C, rotation will be imparted to said pinion by the walls of the groove as follows: If the disk is turning to the right, the right-hand wall *a* of the part C behind the tooth entering the groove in front of it, passing against said tooth, will lift it and turn the pinion to the right until the said tooth arrives at the upper angle of the groove, at which time it is vertically over the axis of the pinion and as high as it rises in its revolution. At this time the next tooth is entering the groove at the next opening behind, to be acted on the same way, while the first going forward and downward is acted on by the left-hand wall *e* of groove D and escapes from the groove on the left-hand side of the block C at the time the third tooth enters the third opening on the ascending side of the pinion. If the small wheel be the driver the action of teeth E and walls of the groove will be reversed—that is, the teeth will impel the drum instead of being impelled by it. The improvement in the chain-drum H consists in having the forked carrier I thereof made adjustable radially for increasing or diminishing the diameter to accommodate it to belts of different lengths, and for tightening them, and for regulating the speed. In this example the said carriers are arranged in radial grooves and held by screws passing through and clamping them to the drum, the said carriers either having long slots to allow them to be adjusted on the bolts or a series of holes for shifting the bolts from one to another for the purpose of obtaining any speed desired.

Having thus described my invention, I claim as new and desire to secure by Letters Patent—

1. The cam-groove in the drum B and the pinion F, constructed, arranged, and the pinion and drum combined, substantially as specified.

2. The chain-carriers I of the drum H, made adjustable radially, substantially as specified.

SAMUEL S. REMBERT.

Witnesses:
GEO. H. STONELAKE,
R. L. STEELE.